US005571319A

United States Patent [19]
Berke et al.

[11] Patent Number: 5,571,319
[45] Date of Patent: Nov. 5, 1996

[54] CEMENT ADMIXTURE

[75] Inventors: Neal S. Berke, Chelmsford, Mass.; Michael P. Dallaire, Dover, N.H.

[73] Assignee: W. R. Grace & Co.-Conn., New York, N.Y.

[21] Appl. No.: 529,388

[22] Filed: Sep. 18, 1995

[51] Int. Cl.$^6$ ............................ C04B 22/00; C04B 24/02
[52] U.S. Cl. ........................ 106/802; 106/737; 106/819; 106/823
[58] Field of Search ................................. 106/724, 737, 106/802, 738, 817, 819, 823

[56] References Cited

U.S. PATENT DOCUMENTS

| | | |
|---|---|---|
| 2,364,555 | 12/1944 | Scripture . |
| 3,583,880 | 6/1971 | Moren et al. . |
| 3,709,707 | 1/1973 | Rehmar . |
| 5,020,598 | 6/1991 | Cowan et al. . |
| 5,176,752 | 1/1993 | Scheiner ................................. 106/737 |
| 5,181,961 | 1/1993 | Umaki et al. . |
| 5,356,671 | 10/1994 | Drs ......................................... 106/802 |
| 5,472,501 | 12/1995 | Dastøl ..................................... 106/737 |

FOREIGN PATENT DOCUMENTS

| | | |
|---|---|---|
| 308950A1 | 3/1989 | European Pat. Off. . |
| 0554046A1 | 8/1993 | European Pat. Off. . |
| 0643022A1 | 3/1995 | European Pat. Off. . |
| 48-43014 | 6/1973 | Japan . |
| 55-27819 | 2/1980 | Japan . |
| 59-21557 | 2/1984 | Japan . |
| 06072749 | 3/1994 | Japan . |

OTHER PUBLICATIONS

Hackh's et al. "Chemical Dictionary" Fifth edition, 1987 McGraw-Hill, Inc. pp. 462–463. (no month).

*Primary Examiner*—Karl Group
*Assistant Examiner*—Michael Marcheschi
*Attorney, Agent, or Firm*—Howard J. Troffkin

[57] ABSTRACT

A fluid, stable aqueous dispersion of silica fume and alkali or alkaline earth metal nitrite salt. The dispersion contains a water soluble alkylene glycol.

28 Claims, No Drawings

CEMENT ADMIXTURE

BACKGROUND OF THE INVENTION

The present invention is directed to a storage stable aqueous composition of silica fume and an alkali metal nitrite. The present composition is useful as a cement admixture to provide enhanced compressive strength and impart corrosion resistance to the resultant concrete structure.

Specifically, the present invention is directed to a storage stable aqueous composition containing silica fume, and metal nitrite salt with at least a stabilizing amount of an alkylene glycol or oxyalkylene glycol. The composition imparts the desired properties of enhanced compressive strength and corrosion inhibition to cement compositions, such as mortar and concrete.

It has been known that silicious material such as fume silica can impart enhanced strength to cement compositions when made part of its formulation. It has also been known that alkali and alkaline earth metal nitrites, such as calcium nitrite, can impart set acceleration and corrosion resistance with respect to the metal elements contained in the treated concrete formations.

It would be desirable to have a single cement admixture composition which cn be applied at the job site to provide both of these additive materials for their known purpose. However, when one has previously attempted to incorporate a metal nitrite salt, such as calcium nitrite, into aqueous silica fume dispersions, one causes the dispersion to produce a hard gel product. Such products are not suitable for use as an admixture which can be readily applied at the job site.

It has been unexpectedly found that when a water soluble alkylene glycol or oxyalkylene glycol, as fully described below, is present, one obtains a stable, fluid, aqueous dispersion of silica fume and alkali metal nitrite. Further, if the glycol is present in certain amounts, the subject admixture further provides inhibition of drying shrinkage to the treated cement composition.

Hydraulic cement compositions, such as mortar (cement, small particulate, e.g. sand, and water), or concrete (cement, small particulate, large particulate, e.g. gravel, and water), have certain properties which substantially effect their durability. The properties of compressive strength, corrosion inhibition of metal members and lack of cracks and other defects due to shrinkage which occurs during drying of the cured structural member are highly desired.

One of the main advantages of using concrete compositions, to form architectural structural members is their ability to be cast into a desired form which is capable of exhibiting high compressive strength. With increased strength, the concrete can bear greater loads or be used to form smaller members capable of bearing equal loads to its non-treated counterpart.

It is highly desired to provide a cement admixture which is capable of inhibiting corrosion of metal reinforcing elements in structural concrete compositions while enhancing the compressive strength of the resultant cured structure.

Alkylene glycols and glycerols have been used in combination with cement compositions for particular purposes. For example, these materials have been added to inhibit water crystal formation when casting in cold climate conditions or to inhibit the rate of evaporation of water in cement slurries used in high temperature well bore hole applications. Further, these additives have been used to provide a layer above cast, unset composition to inhibit evaporation of water at the surface portion of the structure and thereby enhancing the hydration of the cement at that portion of the formation.

It is highly desirable to have a single admixture composition which is capable of providing both enhanced compressive strength and corrosion inhibition and which is a storage stable, flowable, uniform aqueous dispersion. It is further desirable to provide a single storage stable, uniform admixture composition which provides enhanced compressive strength, corrosion inhibition and reduced drying shrinkage.

SUMMARY OF THE INVENTION

The present invention is directed to a cement admixture, and a method of forming an improved structural concrete formation, which is a storage stable, free flowing admixture capable of inhibiting corrosion of metal elements in contact with the concrete and causing enhanced compressive strength to the treated formation. The admixture comprises a synergistic aqueous mixture of an alkali or alkaline earth metal nitrite and fumed silica in the presence of a stabilizing amount of a lower alkylene glycol or poly(oxyalkylene)glycol.

DETAILED DESCRIPTION

The present composition is an aqueous dispersion of silica fume particulate and an alkali metal or alkaline earth nitrite with a stabilizing amount of glycol, as described hereinbelow.

The alkali and alkaline earth metal nitrites have been known to provide non-corrosive set acceleration to cement compositions and also to inhibit the corrosion of metal elements, such as reinforcing rods and the like, in contact with or contained in the resultant formation formed from the cement composition. The metal salt may be of any metal such as calcium, sodium, lithium or the like with calcium being preferred.

The silica fume found useful in the present invention is an amorphous silica by-product, such as formed during conventional silicon and ferrosilicon metal alloy production or derived from the pyrolysis of rice hulls and the like. The term "silica fume", as used in the present application and the appended claims, is a micro-particulate by-product material retrieved from the stack gases of electric arc furnaces or the like during production of a silicon or ferrosilicon alloy in which the iron to silicon metal content is in a ratio of from about 0:100 to about 30:70 or derived from the pyrolysis of rice hulls or calcined amorphous alumina silica clays (e.g. meta-kaolin) and the like.

The main constituent of the subject silica fume is silicon dioxide normally present in from about 86 to about 95 percent by weight. The analysis and properties of a typical silica fume obtained from ferro-silicon alloy production is shown below:

| Component | % by weight |
| --- | --- |
| $SiO_2$ | 86–90 |
| SiC | 0.1–0.4 |
| $Fe_2O_3$ | 0.3–5.0 |
| $TiO_2$ | 0.002–0.006 |
| $Al_2O_3$ | 0.2–1.7 |
| MgO | 1.0–3.5 |
| CaO | 0.2–0.5 |

| Component | % by weight |
| --- | --- |
| Na₂O | 0.3–1.8 |
| K₂O | 1.5–3.5 |
| S | 0.2–0.4 |
| C | 0.8–2.3 |
| P | 0.3– |
| Ignition loss (1000° C.) | 2.4–4.0 |
| Bulk density, from bunker, g/L | 200–300 |
| Bulk density, compacted, g/L | 500–700 |
| Real density, g/cm³ | 2.20– |
| Specific surface, m²/g | 18–22 |
| Primary particle size, percentage <1 μm | 90 |

Fumed silica is a light, fluffy material which is somewhat difficult to handle as a dry powder. However, silica fume can be readily dispersed in aqueous solutions which have up to about 75 weight percent silica-fume therein.

Past attempts to combine alkali or alkaline earth metal nitrites with silica fume dispersions has caused the dispersion to become unstable and provide a hard gel product. Such condition is not acceptable to provide an easily dispensable single admixture composition.

In many applications, the combination of enhanced compressive strength and corrosion inhibition of a cement formation is highly desired. This is especially so where the formation is subject to corrosive environment, such as bridge decks, piers, parking garages and the like. A single admixture which can be readily dispensed to provide both of the above properties is desired. However, when an alkali or alkaline earth metal nitrite is added and made part of a silica fume dispersion the resultant combination gels to a non-dispensable composition. However, it has now been found that when the silica fume dispersion contains a glycol, as described below, the addition and presence of the metal nitrite does not cause gelation but instead provides an aqueous storage stable, fluid dispersion which can be readily dispensed at the job site.

The present unique combination of compounds forming the subject cement admixture requires the use of an alkylene glycol represented by the general formula HOBOH (Formula I) wherein B represents a $C_3$–$C_{12}$ alkylene group, preferably a $C_5$–$C_8$ alkylene group. Examples of such glycols are 1,6 hexanediol, 1,5-pentanediol, 1,4-pentanediol, 2-methyl-2,4-pentanediol and the like. The preferred diols are secondary and/or tertiary dihydroxy $C_5$–$C_8$ alkanes which are represented by the formula:

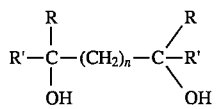

II wherein each R independently represents a hydrogen atom or a $C_1$–$C_2$ alkyl group, each R' represents a $C_1$–$C_2$ alkyl group and n represents an integer or 1 or 2. The most preferred compound is 2-methyl-2,4-pentanediol.

Alternately, the alkylene glycols found useful in the present invention are condensed alkylene glycols which is represented by the formula $HO(AO)_xH$ where A represents a $C_2$–$C_4$ alkylene group, such as ethylene, propylene, isopropylene, butylene and the like and mixtures thereof with $C_2$ and $C_3$ alkylene groups preferred; O represents an oxygen atom and x is an integer of from 1 to about 20, preferably from 1 to 10, provided the glycol is soluble in water. Examples of such glycols include diethylene glycol, dipropylene glycol, tripropylene glycol, di(oxyethylene)di(oxypropylene) glycol as well as poly(oxyalkylene) glycols having molecular weight of up to about 1200. The AO groups of such polyoxyalkylene glycols may be of single alkylene or a mixture of alkylene groups which are in either block or random configuration.

The subject glycol should be introduced into a silica fume dispersion prior to the addition of the metal nitrite. Further, the glycol may be a mixture of alkylene glycols described above in any proportion.

The dispersion may contain silica fume material in from about 10 to about 50 (preferably from about 30 to 40) weight percent based on total weight of the admixture composition. The metal nitrite (preferably calcium nitrite) should be present in a nitrite salt to silica fume weight ratio of from about 1:2 to about 1:15, preferably from about 1:5 to about 1:7. The glycol can be present in stabilizing amounts of at least about 5 weight percent, preferably 10 to 30 weight percent based on the silica fume present in the dispersion. Higher quantities of glycol can be used and will, in addition to providing a favorable, stable dispersion, provide drying shrinkage reduction to the treated cement composition. It is therefore preferred to have the glycol present in from about 30 to 70, preferably 40 to 70 weight percent based on the fume silica present in the dispersion.

The admixture composition of the present invention may be used with hydraulic cements suitable for architectural structural application, such as ordinary, quick-hardening and moderate-heat portland cements, high alumina cements, blast-furnace slag cement and the like. Of these, portland cements of the ordinary and quick-hardening types are particularly desired and most readily used to form architectural structural members.

The cement admixture of the present invention may be used in from about 2 to about 25, preferably about 5 to about 20 and most preferably from about 7 to about 15 weight percent based on the weight of cement content of the cement composition being treated. The quantity of water used for setting the cement composition can vary within the weight ratios of water to cement of from 0.2:1 to 0.7:1, preferably 0.3:1 to 0.5:1. Aggregate, such as pebble, gravel, sand, pumice or fired perlite, as required may be employed in conventional amounts.

An improved cement composition can be formed in situ during the course of preparing a mortar or concrete composition. The admixture composition can be added either separately or as part of the water of hydration. The water content of the dispersion should be calculated as part of the total water content of the cement composition.

Various conventional ingredients may be optionally used in forming the improved cement composition. Among the optionally employable ingredients are: conventional hardening accelerators, e.g. metal chlorides such as calcium chloride and sodium chloride, metal sulfates, such as sodium sulfate, and organic amines such as triethanolamine; ordinary hardening retarders, e.g. alcohols, sugars, starch and cellulose; water reducing agents and high-range water reducers, such as lignosulfonic acids and their salts, and derivatives, hydroxylated carboxylic acids and their salts, naphthalenesulfonate-formaldehyde condensation products, sulfonated melamine polycondensation products, amines and their derivatives, alkanolamines, and inorganic salts such as borates, phosphates, chlorides and nitrates and the like. The quantity of such an optional ingredient or ingredients is usually 0.05–6% by weight of the cement content of the concrete.

The addition of the cement admixture composition of the present invention to a concrete composition will markedly enhance compressive strength compared with that of untreated composition, will inhibit corrosion and, when the glycol is present in greater than stabilizing amounts, provide the reduction of drying shrinkage.

The following examples are given for illustrative purposes only and are not meant to be a limitation on the invention, as defined by the claims appended hereto. All parts and percentages are by weight unless otherwise indicated. The term "S/S" means solid additive based on solid cement of the treated composition.

EXAMPLE 1

Concrete samples were formed using a mix design proportioned by a volumetric method according to ACI guidelines. The design requirements were based on 658 parts Type I Portland cement, 1300 parts West Sand fine sand, 1750 parts Wrentham 0.75 inch coarse aggregate and 263 parts water. The fine aggregate was adjusted to project design parameters of 2% air content, 0.37 water to cement ratio and a slump of about 5 inches.

Silica fume slurries used were either a commercial aqueous micro silica slurry having 48 weight percent silica fume from silicon alloy production with 2 weight percent naphthalene sulfonate-formaldehyde condensation product as a dispersant ("FS Slurry 1"). Further, silica fume slurries were formed from water dispersions with 45 weight percent silica fume and 11 weight percent polypropylene glycol (MW= 425) ("FS Slurry 2") and with 30 weight percent silica fume having 2 weight percent naphthalene sulfonate-formaldehyde, as in the commercial product, to which was first added 12 weight percent polypropylene glycol (MW=425) and then 6 weight percent calcium nitrite ("FS Slurry 3") to provide a free flowing slurry. When attempting to add calcium nitrite directly to the commercial silica fume dispersion without the presence of the oxyalkylene glycol, only a hard gel was obtained.

The concrete was formed according to ASTM C-192 specifications. The water, coarse aggregate, fine aggregate and the appropriate silica fume slurry were initially charged into a concrete mixer and mixed for one minute. The Portland cement was then added and mixing continued for an additional three minutes followed by a three minute rest period and a final two minutes of mixing. The resultant samples were tested according to ASTM C-143 for slump, ASTM C-138 for weight and yield, ASTM C-231 for air content of the freshly mixed samples.

The results are shown in Table I below. Firstly, as stated above a silica fume slurry formed with calcium nitrite only provided a resultant composition which was a hard, non-dispensable material and, therefore, not useful in treating concrete. The reference sample 1 was formed without additive except for naphthalene sulfonate-formaldehyde and exhibited conventional compressive strengths and shrinkage during drying (ASTM C-157). Sample 2 was formed with the addition of silica fume slurry to provide a 7.5 percent S/S silica fume and 2 percent S/S NSF to the composition. Similarly, Sample 3 was formed to provide a dosage of 7.5 percent S/S silica fume and 2 percent S/S polyoxyalkylene glycol (PPG).

Sample 4 formed according to the present invention provided a single dosage cement admixture which was readily mixed with the concrete formulation and provided a product having enhanced compressive strength, reduction in drying shrinkage and long term inhibition to corrosion of metal elements which would be contained in the set structural formation.

TABLE 1

| Sample | Slurry (% S/S) | NSF oz/yd$^3$ | Slump (in.) | Plastic Air (%) | Compressive Strength PSI | | | Corrosion Control +/− | % Shrinkage Reduction (56 days)* |
| --- | --- | --- | --- | --- | --- | --- | --- | --- | --- |
| | | | | | 1 day | 7 days | 28 days | | |
| 1 | — | 53 | 5.5 | 2.5 | 2900 | 5030 | 6380 | − | — |
| 2 | FS (5) | 53 | 6.5 | 2.6 | 3970 | 7200 | 9040 | − | −4% |
| 3 | FS (7.5) PPG (2) | 72 | 5.25 | 2.0 | 3450 | 5740 | 7890 | − | 28% |
| 4 | FS (5) PPG (2) Ca(NO$_2$)$_2$ (1) | 53 | 6.25 | 3.0 | 2150 | 5270 | 7390 | + | 12% |

*negative number represents increased shrinkage with respect to Sample 1. positive number represents decreased shrinkage with respect to Sample 1.

Example II

Mortar mixes were formed by mixing 2.7 parts sand, 1.0 part Type I Portland cement and 0.42 part water according to the procedure of ASTM C-305. The water was initially introduced in the mixing container followed by the cement and mixing was commenced for about 30 seconds. The sand was then introduced into the container over the next 30 seconds while mixing. The mixing was continued at medium speed for an additional 30 seconds followed by 1.5 minutes rest and then one final minute of mixing. When the silica fume slurry was added, it was added during the addition of fine aggregate based on a dosage of 0.075 part silica fume.

The samples were measured for unit weight and air content according to ASTM C-185, Workability according to ASTM C-280, Compressive strength according to ASTM C-109 using 2 in. cubes. The water content of the silica fume was accounted for as part of total water used.

Samples 1 and 2 were formed for comparative purposes. Sample 1 contained small amounts of NSF condensate to provide design flow. Sample 2 contained a silica fume slurry containing 44% silica fume, 2% NSF was used to provide 5% silica fume with 2% NSF. Sample 3 was treated with a fluid silica fume slurry of 30% silica fume, 12% polypropylene glycol (MW=425), 6% calcium nitrite, and 2% NSF and Sample 4 was treated with a fluid slurry which is the same as Sample 3 except that polyethylene glycol (MW= 400) was used as the glycol component.

The results are shown in Table 2 below.

TABLE 2

| Slurry Sample | (% S/S) | Flow | Air (%) | Compressive Strength PSI | | | Corrosion Control +/− | % Shrinkage Reduction (56 days)* |
|---|---|---|---|---|---|---|---|---|
| | | | | 1 day | 7 days | 28 days | | |
| 1 | — | 61 | 1.0 | 2040 | 5290 | 8390 | − | — |
| 2 | FS (5) NSF (0.2) | 73 | 1.0 | 2735 | 5845 | 8135 | − | −19% |
| 3 | NSF (0.3) FS (5) PPG (2) Ca(NO$_2$)$_2$ (1) | 94 | 1.0 | 2195 | 7105 | 10405 | + | 21% |
| 4 | FS (5) PEG (2) Ca(NO$_2$)$_2$ (1) NSF (0.3) | 89 | 2.3 | 2450 | 7475 | 11175 | + | −2% |

What is claimed is:

1. A cement admixture comprising a uniform aqueous dispersion of
   a) from about 10 to 50 weight percent of silica fume;
   b) at least one alkali metal or alkaline earth metal nitrite in a weight ratio of nitrite salt to silica fume of from about 1:2 to 1:10; and
   c) at least a stabilizing amount of at least one glycol selected from (i) C$_3$–C$_{12}$ alkylene glycol or (ii) a water soluble condensed alkylene glycol represented by the formula HO(AO)$_x$H wherein A is a C$_2$–C$_4$ alkylene or mixture thereof, O represents oxygen and x is an integer of from 1 to 20; or mixtures thereof.

2. The cement admixture of claim 1 wherein the silica fume is a by-product of silicon and/or ferro silicon alloy production and the glycol is present in from about 30 to 70 weight percent based on the silica fume present in the admixture.

3. The cement admixture of claim 1 wherein the silica fume is a product of pyrolysis of rice hull or calcining of alumina-silica clay and the glycol is present in from about 30 to 70 weight percent based on the silica fume present in the admixture.

4. The cement admixture of claim 1, wherein the C$_3$–C$_{12}$ alkylene glycol is represented by the formula HOBOH wherein B is a C$_5$–C$_8$ alkylene.

5. The cement admixture of claim 2, wherein the C$_3$–C$_{12}$ alkylene glycol is represented by the formula HOBOH wherein B is a C$_5$–C$_8$ alkylene.

6. The cement admixture of claim 3, wherein the C$_3$–C$_{12}$ alkylene glycol is represented by the formula HOBOH wherein B is a C$_5$–C$_8$ alkylene.

7. The admixture of claim 1 wherein said C$_3$–C$_{12}$ alkylene glycol is represented by the formula

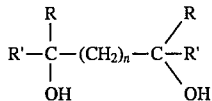

wherein each R represents a hydrogen atom or C$_1$–C$_2$ alkyl; each R' represents C$_1$–C$_2$ alkyl; and n represents 1 or 2.

8. The admixture of claim 2 wherein said C$_3$–C$_{12}$ alkylene glycol is represented by the formula

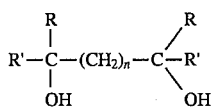

wherein each R represents a hydrogen atom or C$_1$–C$_2$ alkyl; each R' represents C$_1$–C$_2$ alkyl; and n represents 1 or 2.

9. The admixture of claim 3 wherein said C$_3$–C$_{12}$ alkylene glycol is represented by the formula

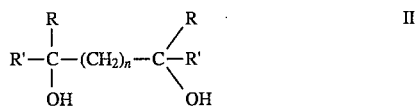

wherein each R represents a hydrogen atom or C$_1$–C$_2$ alkyl; each R' represents C$_1$–C$_2$ alkyl; and n represents 1 or 2.

10. The admixture of claim 7 wherein said C$_3$–C$_{12}$ alkylene glycol is 2-methyl-2,4-pentanediol.

11. The admixture of claim 1 wherein the alkali metal nitrite is calcium nitrite.

12. The admixture of claim 4 wherein the alkali metal nitrite is calcium nitrite.

13. The admixture of claim 7 wherein the alkali metal nitrite is calcium nitrite.

14. The admixture of claim 1 wherein the condensed alkylene glycol is represented by the formula HO(AO)$_x$H wherein A is a C$_2$–C$_3$ alkylene or mixture thereof, O is oxygen, and x is a value of 1 to 10.

15. The admixture of claim 2 wherein the condensed alkylene glycol is represented by the formula HO(AO)$_x$H wherein A is a C$_2$–C$_3$ alkylene or mixture thereof, O is oxygen, and x is a value of 1 to 10.

16. The admixture of claim 3 wherein the condensed alkylene glycol is represented by the formula HO(AO)$_x$H wherein A is a C$_2$–C$_3$ alkylene or mixture thereof, O is oxygen, and x is a value of 1 to 10.

17. The admixture of claim 14 wherein the alkali metal nitrite is calcium nitrite.

18. The admixture of claim 15 wherein the alkali metal nitrite is calcium nitrite.

19. The admixture of claim 16 wherein the alkali metal nitrite is calcium nitrite.

20. A method of forming a concrete structural formation comprising:
   (i) forming a cement composition composed of a hydraulic cement, fine aggregate, coarse aggregate and water with a water to cement weight ratio of from 0.25:1 to 0.7:1;
   (ii) adding to said cement composition from 2 to 25 weight percent, based on the hydraulic cement content of the cement composition, of a cement admixture comprising a uniform aqueous dispersion of
      a) from about 10 to 50 weight percent of silica fume;
      b) at least one alkali metal or alkaline earth metal nitrite in a weight ratio of nitrite salt to silica fume of from about 1:2 to 1:10; and
      c) at least a stabilizing amount of at least one glycol selected from (i) C$_3$–C$_{12}$ alkylene glycol or (ii) a water soluble condensed alkylene glycol represented by the formula $HO(AO)_xH$ wherein A is a $C_2$–$C_4$ alkylene or mixture thereof, O represents oxygen and x is an integer of from 1 to 20; or mixtures thereof.

21. The method of claim 20 wherein the silica fume is a by-product of silicon and/or ferro silicon alloy production and the glycol is present in from about 30 to 70 weight percent based on the silica fume present in the admixture.

22. The method of claim 20 wherein the silica fume is a product of pyrolysis of rice hull or calcining of alumina-silica clay and the glycol is present in from about 30 to 70 weight percent based on the silica fume present in the admixture.

23. The method of claim 21 wherein the $C_3$–$C_{12}$ alkylene glycol is represented by the formula HOBOH wherein B is a $C_5$–$C_8$ alkylene.

24. The method of claim 22 wherein the $C_3$–$C_{12}$ alkylene glycol is represented by the formula HOBOH wherein B is a $C_5$–$C_8$ alkylene.

25. The method of claim 21 wherein the condensed alkylene glycol is represented by the formula $HO(AO)_xH$ wherein A is a $C_2$–$C_3$ alkylene or mixture thereof, O is oxygen, and x is a value of 1 to 10.

26. The method of claim 22 wherein the condensed alkylene glycol is represented by the formula $HO(AO)_xH$ wherein A is a $C_2$–$C_3$ alkylene or mixture thereof, O is oxygen, and x is a value of 1 to 10.

27. The method of claim 24 wherein the metal nitrite is calcium nitrite.

28. The method of claim 26 wherein the metal nitrite is calcium nitrite.

* * * * *